United States Patent Office 2,764,188
Patented Sept. 25, 1956

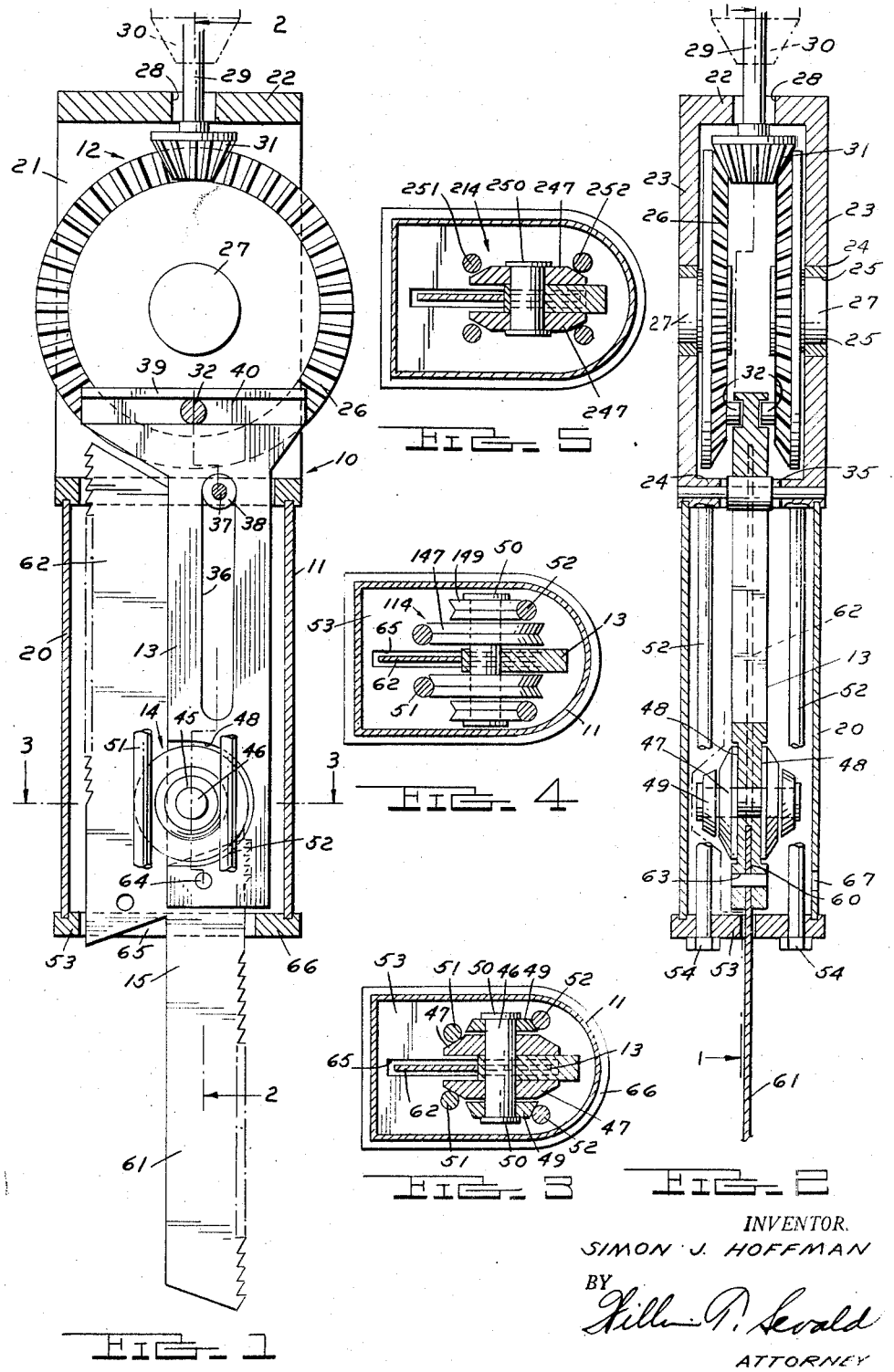

2,764,188

RECIPROCATING SAW WITH REVERSIBLE BLADE

Simon J. Hoffman, Utica, Mich.

Application October 7, 1953, Serial No. 384,587

3 Claims. (Cl. 143—60)

This invention relates to reciprocating saws and more particularly to a portable, power-driven, reciprocating saw having novel mounting and supporting means for the saw blade which enable the stroke of the blade to be greater than is customary in saws of this type while at the same time being rigidly and antifrictionally supported in a suitable housing.

Prior are saws of this character have utilized a high speed motor to reciprocate the saw blade. When using a high speed motor the blade must be positively and rigidly secured to a support to prevent any "play" of the blade relatively to its support for the obvious reasons that any blade play would interfere with a clean cut as well as present a hazard to the user.

In preventing blade play in prior art reciprocating saws, the blade support usually comprises a carriage which occupies a considerable portion of the saw housing. The support must reciprocate with the blade, and because of the size of the support with respect to the housing, there is very little space available in which to reciprocate the support. The result of this lack of space means that the stroke of the saw blade is very short, usually considerably less than one inch. The rapid reciprocation of the blade over such a short distance means that in sawing operations only a small portion of the saw actually is in contact with the work to be sawed causing that portion to become excessively hot with resultant damage to the blade, the work, or both.

The desirable stroke of a power-driven reciprocating saw for general application should be at least two inches to obviate the above noted defects. Prior art saws have not increased their stroke, however, because a longer stroke would require elongation of the housing, due to the size of the blade support, to such an extent that the saw would be bulky, unwieldy, and unbalanced for ease of operation.

With the foregoing in view, therefore, it is a primary object of this invention to provide a power-driven, reciprocating saw having blade supporting means enabling the stroke to be the desired length while at the same time not increasing the length of the housing.

Another object of the invention is to provide a reciprocating saw having anti-friction supporting means which also function to guide the saw blade and maintain it in proper alignment.

Another object of the invention is to provide a reciprocating saw having driving means which also serve as stabilizing means for maintaining the saw in proper alignment.

Another object of the invention is to provide a reciprocating saw having single-point, saw blade mounting means to maintain the saw blade in proper relation to the remainder of the structure.

A further object of the invention is to provide a saw blade and mounting means therefor which utilize the natural tendency of the saw blade to deflect when in use to position and maintain the blade in proper cutting position.

A further object of the invention is to provide a reciprocating saw which permits a two bladed saw to be utilized with one blade extended in cutting position and the other blade retracted and stored within the saw housing and serving to aid in positioning the extended blade.

A further object of the invention is to provide a power-driven, reciprocating saw having a materially reduced number of parts with a resultant saving in manufacturing cost, the saw being simple in design yet rugged and durable in construction.

These and other objects and advantages of the invention will be specifically pointed out or will become apparent from the following specification when considered in conjunction with the accompanying drawings wherein:

Fig. 1 is a side elevational view, partly in cross-section, illustrating the arrangement of the various elements of the novel saw;

Fig. 2 is a cross-sectional view of the reciprocating saw taken on the line 2—2 of Fig. 1;

Fig. 3 is a cross-sectional view taken on the line 3—3 of Fig. 1 illustrating one form of anti-friction support for the saw blade;

Fig. 4 is a view similar to Fig. 3 but showing a slightly modified form of blade support; and Fig. 5 is a view similar to Figs. 3 and 4 illustrating a further modification of the blade support.

Referring now to the drawings wherein like numerals refer to like and corresponding parts throughout the several views, the embodiment of the reciprocating saw 10 disclosed in Figs. 1–3 to illustrate one form of the invention comprises a housing 11, driving means 12, saw blade actuating means 13 driven by the driving means, anti-friction supporting means 14 secured to the actuating means, and a saw blade 15 fixed to the actuating means and projecting beyond the end of the housing in cutting position.

More particularly the casing 11 for the reciprocating saw 10 consists of three sections which may be termed a front section 20, an intermediate section 21 and a rear section (not shown) which houses an electric motor (not shown) and extends over the intermediate section 21 so as to completely enclose driving means 12. The rear section of the housing may be of any suitable type existing in the art and may be secured to the intermediate section by any suitable means and is not shown in the drawings because such structures are well known and form no part of this invention per se.

The intermediate section 21 of the housing comprises an essentially rectangularly shaped structure having an end wall 22, parallel side walls 23, and a front wall 24. Each side wall 23 is provided with a centrally located aperture 24 in which are disposed suitable bearings 25 providing journals for a pair of matched beveled gears 26 supported on stub shafts 27. The rear wall 22 of housing section 21 is apertured as at 28 for reception of a shaft 29 fixed at one end to collet 30 carried by the electric motor (not shown). The other end of the shaft 29 carries a beveled pinion 31 which meshes with both beveled gears 26 so as to drive them in opposite directions. Each beveled gear 26 has positioned thereon oppositely facing studs 32 about which more will be said later.

The front wall 24 of the intermediate housing section 21 is provided with an elongated slot 35 through which extends the rear end of the saw blade actuator or reciprocator 13. The reciprocator 13 is provided with an elongated longitudinally extending slot 36 located at substantially the central portion thereof. To provide vertical anti-frictional support for the rear end of the reciprocator 13, a pin 37 having a rotatable sleeve 38 of any suitable construction surrounding the pin extends from side to side of the intermediate housing section 21 spanning the slot 35 and projecting through the reciprocator slot 36. The rearmost end of the reciprocator 13 is flared outwardly to form a substantially bell-shaped section 39 and adjacent the end of this section each side of the reciprocator is provided with an elongated transversely extending slideway 40 into which the studs 32 on the beveled gears 26 are adapted to be slidably received.

Intermediate the front end of the slot 36 and the front of the reciprocator 13 there is provided an aperture 45 in the actuator for reception of a pin or bearing axle 46. Axle 46 constitutes the mounting structure in conjunction with the actuator 13 for the anti-friction supporting means 14 for the saw blade. Adjacent each end of the axle 46 there is mounted a beveled roller 47, one on each side of the actuator 13 and fitting within a semicircular recess 48 formed in each side thereof to reduce the lateral dimension of the actuator and the rollers. At the extremities of the axle 46, there is a second pair of ball-bearing beveled rollers 49 which are of less diameter than rollers 47. The two sets of rollers may be suitably spaced apart from each other and from the actuator by suitable means to prevent interference between themselves, and the ends of the axle 46 are peened over to form heads 50 to prevent displacement of the rollers from the axle.

Above and below the two pairs of rollers are paired rails or tracks 51 and 52, respectively, which serve both as guiding and constraining means for the reciprocator 13. At their rear ends, the tracks 51 and 52 may be threaded into or welded to the front wall 24 of the intermediate section 21 and at their front ends, they project through apertures formed in the removable front plate 53 of the front housing section 20. The forward ends of the tracks 51 and 52 are threaded for reception of nuts 54 which may be turned down tightly against the front plate 53, not only to hold the front plate in position but also to tension the rails 51 and 52. With the front plate 53 secured, the two sets of rollers lie between their two pairs of tracks, the first pair of rollers 47 having their beveled edges in contact with the inner surfaces of the top pair of tracks 51 and the second pair of rollers 49 having their beveled edges in contact with inner surfaces of the lower pair of tracks 52.

In connection with the positioning of the several rollers and tracks, the lower tracks 52 are disposed outwardly of the upper tracks and closer to the axis of rotation of the rollers to preclude any possibility of interference with the inner pair of rollers 47.

The forward end of the actuator 13 is provided with a slot 60 (Fig. 2) which is adapted to receive the saw blade 15. The saw blade 15 is a double blade having two sections 61 and 62, the two sections being offset from each other along a zig-zag line at the center of the blade 15. The slot 60 is shaped to conform to the configuration of the center of the blade. That is, the inner wall of the slot slopes upwardly and forwardly so that there is an overhang of the actuator relatively to the blade to prevent counterclockwise rocking of the saw blade as viewed in Fig. 1. The saw blade 15 is secured in place in the bifurcated end of the actuator by a pin (not shown) which extends through apertures 63 and 64 in the actuator and blade, respectively. With the pin disposed in the apertures 63 and 64, the blade is securely fixed to the actuator for reciprocating motion therewith and is prevented from rocking in a counterclockwise direction by the aforementioned slot 60 cooperating with the offset center of the blade 15, and is prevented from rocking in a clockwise direction by the section 62 which lies along the upper surface of the actuator 13 as shown in Fig. 1.

The front plate 53 of the saw has a vertical slot 65 provided therein through which the blade reciprocates as will be understood. The lower portion of the plate 53 constitutes a bearing surface 66 which may be placed against the edge of the work to prevent chattering of the saw during use.

When using the disclosed reciprocating saw, the parts are assembled as herein described and the electric motor connected to a source of power. A suitable switch conveniently mounted on the motor housing may be thrown to cause rotation of the pinion 31. Rotation of the pinion 31 causes opposite rotation of the gears 26 whose studs 32 will be carried in opposite directions in a circular path and sliding in the slots 40. As the gears 26 are rotated one stud 32 progresses downwardly and rearwardly from the position shown in Fig. 1, while the other stud 32 progresses upwardly and rearwardly. Because the studs are captive in the slots 40, the actuator 13 is drawn rearwardly so as to pass between the gears 26 with the rollers 47 and 49 freely rolling on their respective rails. The horizontal position of the actuator 13 is stabilized by the opposite rotation of the studs 32 which has a tendency to eliminate vertical end play of the actuator, and this stabilizing effect is augmented, of course, by the pin 37 and sleeve 38 riding on the walls of the actuator slot 36.

It will be observed that the stroke of the blade 15 is twice the radial distance from the center of the gears 26 to the studs 32. This distance may be as large or small as practical, but the preferred distance is approximately two inches as this length may be achieved without enlargement of the saw to unwieldy dimensions. The stroke of the blade may be varied by providing the gears 26 with spaced radial apertures and making the studs adjustable in those apertures so as to vary the distance from the gear centers to the studs. The casing 23 will be equipped with corresponding openings, of course, to permit access to the studs for varying their positions.

The speed at which the saw may be operated may be any speed desired as the structure disclosed permits extremely rapid operation without excessive vibration and prevents undue heat being generated. Furthermore, the length of the stroke permits the work contacting area of the blade to be larger than is customary in saws of this character which means that the blade does not become "burned out" through long periods of sustained use, permitting longer life for blades to be realized.

When it becomes desirable to change blades, it is a simple operation. A screw driver may be inserted through an opening 67 in the front housing 20 to remove the locking pin holding the saw blade 15 in the slot 60 of the actuator 13. The blade 15 may then be withdrawn through the slot in the face plate 53 and rotated 180° and reinserted so as to position section 61 within the housing and expose section 62 for use. The locking pin is then returned and the saw is again ready for use. Obviously, the cutting teeth on the saw sections 61 and 62 may be either the same or different types as desired, whereby an operator may have, in effect, two similar saw blades or two different saw blades selectively usable. Due to the single point mounting of the blade 15, the changing or substitution of blades may be accomplished swiftly and easily by the most inexperienced operator.

Fig. 4 discloses a slightly modified form of blade supporting means 114 which is identical in every respect to the form shown in Figs. 1–3 with the exception that the rollers 147 and 149 are grooved rather than beveled and ride under and over rails 51 and 52, respectively.

In Fig. 5 there is shown another modified form of blade supporting means 214 which is somewhat less expensive to manufacture than those illustrated in Figs. 1–4. In Fig. 5, there are only two beveled rollers 247 rotatably mounted on a headed axle 250 and lying between upper and lower pairs of rails 251 and 252. These pairs of rails are vertically aligned and are spaced equidistant from the axis of rotation of the rollers 247. The spacing of the rails, however, is such that when the rollers rest on lower rails 252, there is a slight clearance between the rollers and the upper rails 251, and vice versa, to permit free rotation of the rollers when the saw is operated.

When in use, the operator ordinarily is exerting a downward force on the saw housing with the blade contacting the work. The resistance offered by the work to the downward force of the operator elevates the actuator via the blade 15 so that the rollers 247 bear against the upper pair of rails 251. When the operator releases the downward force, such as when the saw has cut through the work, the actuator drops downwardly and the rollers ride on the lower rails 252. It will be understood that the clearance between the rollers and the rails is exaggerated in the drawings. The actual clearance is only sufficient to permit freedom for the rollers to revolve which need be only minute.

While this invention has been described in detail, various modifications and adaptations are possible. It is intended, therefore, that this disclosure be considered as illustrative only, the scope of the invention being defined in the appended claims.

I claim:

1. A power driven reciprocating saw comprising power conversion means for converting rotary motion to reciprocating motion, a reciprocating arm extending from said means having a saw blade receiving slot in the outer end thereof, anti-friction means guiding and supporting said arm for travel along a line, a two-portion saw blade having one portion offset to the other portion so that said saw blade defines a zig-zag pattern in a plane; said saw blade having one portion edgewise overlying said arm side and the other portion abutting said arm end and constituting an extension thereof, and means fastening said saw blade to said arm; said overlying saw portion constituting a lever for resisting sawing forces exerted on said extending portion.

2. In a device as set forth in claim 1, said anti-friction means comprising rods lying parallel to said arm line of travel and wheels on said arm adapted to ride against said rods.

3. A saw blade for a power driven reciprocating saw comprising a two-portion blade having one portion offset to the other portion so that said saw blade defines a zig-zag pattern in a plane; said saw blade having one portion adapted to edgewise overlie a reciprocating saw arm and the other portion to abut the end of a saw reciprocating arm and to constitute an extension thereof; said overlying saw portion constituting a lever for resisting sawing forces exerted on said extending portion.

References Cited in the file of this patent

UNITED STATES PATENTS

| | | |
|---|---|---|
| 853,609 | Vartmann | May 14, 1907 |
| 925,194 | Keough | June 15, 1909 |
| 1,107,405 | Brooks | Aug. 18, 1914 |
| 1,708,278 | Mendel | Apr. 9, 1929 |
| 1,818,467 | Drucker | Aug. 11, 1931 |
| 1,905,104 | Kerr | Apr. 25, 1933 |
| 2,383,195 | Horman | Aug. 21, 1945 |
| 2,480,957 | Phelps | Sept. 6, 1949 |

FOREIGN PATENTS

| | | |
|---|---|---|
| 18,618 | Great Britain | Aug. 13, 1914 |
| 472,035 | Great Britain | Sept. 15, 1937 |